(12) United States Patent
Kim et al.

(10) Patent No.: US 10,534,676 B2
(45) Date of Patent: Jan. 14, 2020

(54) MEASURING SNAPSHOT DELAY BETWEEN SOURCE DATABASE SYSTEM AND ITS ASYNCHRONOUS REPLICA

(71) Applicant: SAP SE, Walldorf (DE)

(72) Inventors: Kyu Hwan Kim, Seoul (KR); Deok Hoe Kim, Seoul (KR); Beomsoo Kim, Seoul (KR); Juchang Lee, Seoul (KR); Werner Thesing, Lautertal (DE); Christoph Roterring, Sinsheim (DE)

(73) Assignee: SAP SE, Walldorf (DE)

( * ) Notice: Subject to any disclaimer, the term of this patent is extended or adjusted under 35 U.S.C. 154(b) by 410 days.

(21) Appl. No.: 15/442,906

(22) Filed: Feb. 27, 2017

(65) Prior Publication Data
US 2018/0246928 A1    Aug. 30, 2018

(51) Int. Cl.
*G06F 16/00* (2019.01)
*G06F 11/14* (2006.01)
*G06F 16/23* (2019.01)

(52) U.S. Cl.
CPC ...... *G06F 11/1474* (2013.01); *G06F 16/2358* (2019.01); *G06F 16/2365* (2019.01)

(58) Field of Classification Search
CPC .............. G06F 16/2365; G06F 16/273; G06F 11/1474; G06F 11/2035; G06F 11/2097; G06F 16/2358
USPC ........................................................ 707/615
See application file for complete search history.

(56) References Cited

U.S. PATENT DOCUMENTS

| | | | | |
|---|---|---|---|---|
| 5,790,431 A | * | 8/1998 | Ahrens, Jr. ........... | G06F 9/5027 709/226 |
| 8,838,919 B2 | * | 9/2014 | Shi ...................... | G06F 11/2094 711/162 |
| 9,984,140 B1 | * | 5/2018 | Sukumaran .......... | G06F 16/219 |
| 2012/0109895 A1 | * | 5/2012 | Zwilling ............. | G06F 11/1471 707/648 |
| 2015/0261532 A1 | * | 9/2015 | Greiner ............... | G06F 9/30047 712/205 |
| 2016/0182298 A1 | * | 6/2016 | Brooks ............... | G06F 16/2379 709/206 |
| 2017/0116321 A1 | * | 4/2017 | Jain ........................ | G06F 16/21 |

* cited by examiner

*Primary Examiner* — Vincent F Boccio
(74) *Attorney, Agent, or Firm* — Jones Day

(57) ABSTRACT

A computer implemented method is provided for determining a delay between a first database and an associated replicated database by replicating transactions of the first database in the replicated database, determining a delay between the two databases based on a commit timestamp from the first database and a timestamp associated with the commit transaction becoming visible in the replicated database. Then, after a predefined period of time has elapsed since replicating the commit transaction, determining a second delay based on a timestamp associated with a heartbeat log and a replicated database system time. And, selectively determining to execute or deny a statement received by the replicated database based on the second delay. Related apparatus, systems, techniques and articles are also described.

20 Claims, 9 Drawing Sheets

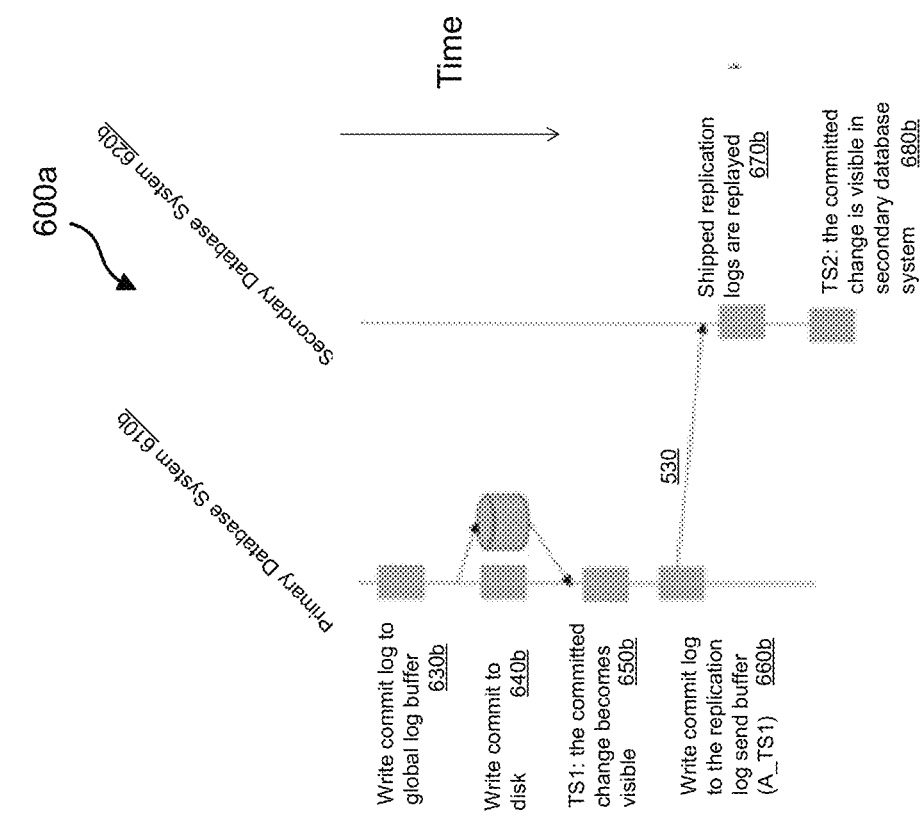
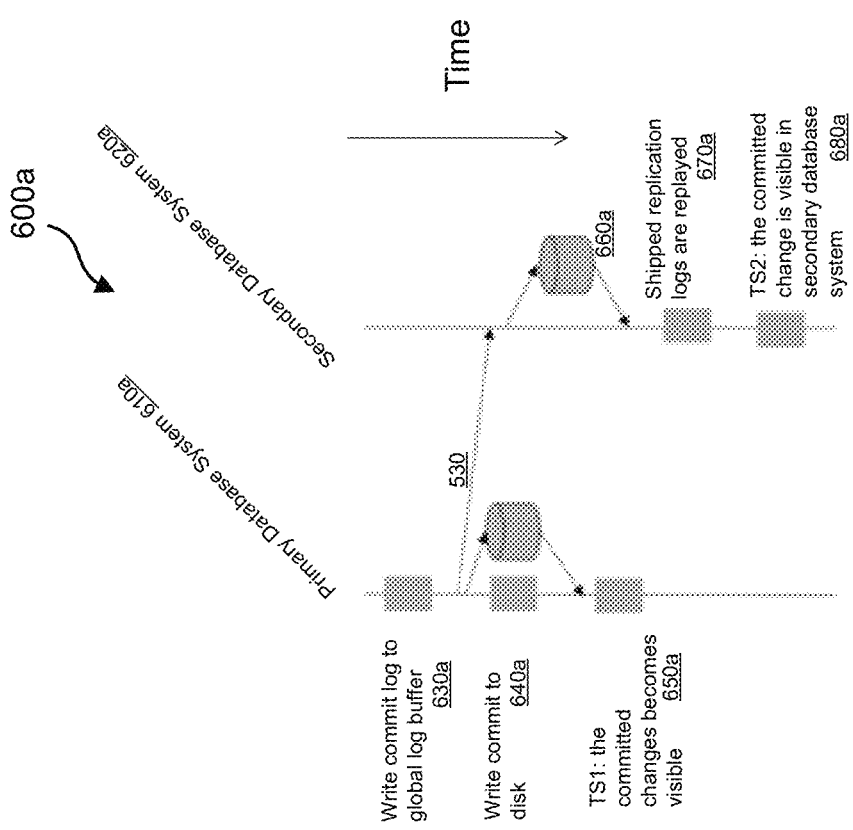
FIG. 6b
FIG. 6a

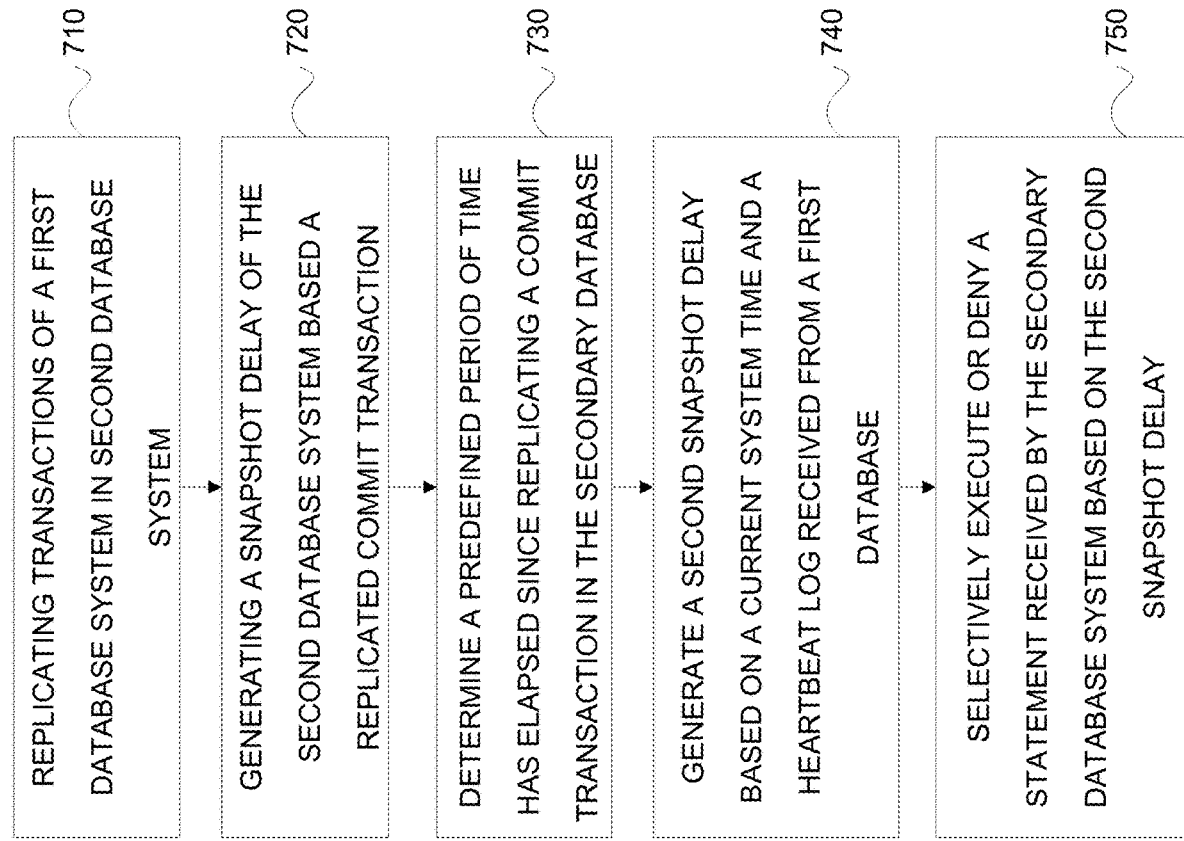

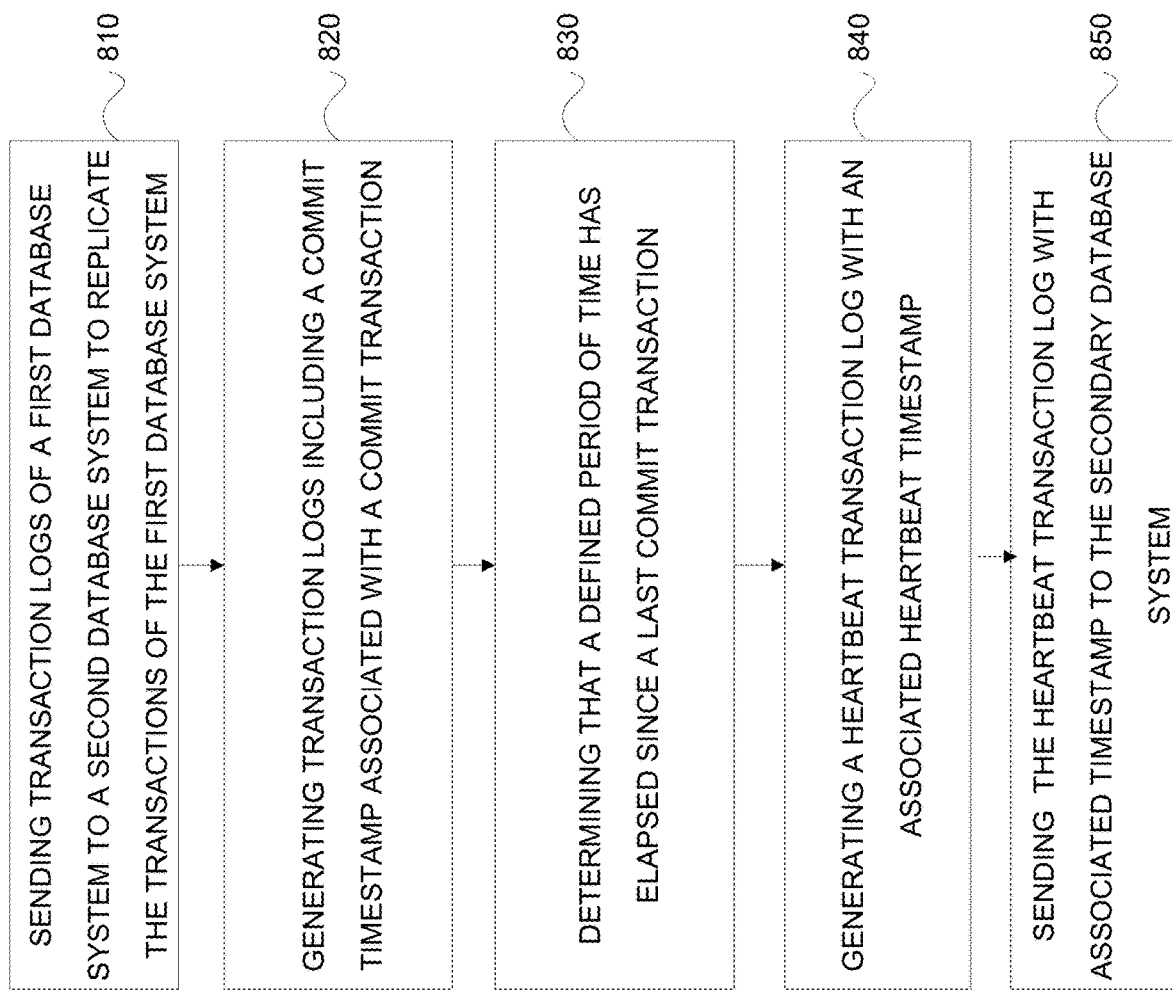

MEASURING SNAPSHOT DELAY BETWEEN SOURCE DATABASE SYSTEM AND ITS ASYNCHRONOUS REPLICA

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

A method for implementation by one or more computer processors forming part of at least one computing device is provided. The method comprises replicating transactions of a first database system in a second database system including a commit transaction associated with a statement received by the first database system, determining a delay between the first database system and the second database system based on a first timestamp associated with the commit transaction and a second timestamp associated with the commit transaction becoming visible in the secondary database, determining that a predefined period of time has elapsed since replicating the commit transaction, receiving a heartbeat log generated by the first database system when a period of time elapses without the first database system performing a second commit database operation, determining a second delay based on a second database system time and a third timestamp associated with the heartbeat log, and selectively determining to execute or deny a statement received by the secondary database system based on the second delay.

These aspects and other embodiments may include one or more of the following features. Generating a return associated with the statement, the return including all records of the second database system relevant to the statement and having a commit timestamp less than or equal to a commit timestamp associated with the commit transaction. The method may further comprise receiving a second client statement requesting a second read operation and determining to deny the second client statement based on a third delay based on a third database system time and the heartbeat log. The second client statement may further be routed to the first database system. The determination to deny the second statement may be responsive to routing data associated with the second statement, the routing data indicating that the second client statement can be executed in either the first database system or the second database system. The method may further comprise receiving a second client statement including both routing data and a request for a read operation, the routing data describing a maximum delay allowable for the statement to be executed in the secondary database system, and determining that the second client statement may be executed in the second database, and routing the statement to a client application with information indicating that the statement may be routed to the second database system for execution. The method may further include receiving a return including the second delay, and discarding the return based on the second delay. The method may also include, requesting a delay from the second database system, and sending a third statement to either the first or second database system based on the delay.

In some aspects, a method is provided that includes executing statements containing requests for database operations in a primary database system, and generating transaction logs containing information for replicating the statements or database operations, generating a commit transaction log associated with a commit database operation, determining that a defined period of time has elapsed since the commit transaction log has been generated, generating a heartbeat log, and sending the transaction logs including the heartbeat transaction log to a secondary database system that mirrors the primary database system, and generating a snapshot delay value based on a timestamp associated with either the commit database operation or the heartbeat transaction log. These aspects and other embodiments may include one or more of the following features. Replicating the statements or database operations of the generated transaction log files in a second database system including the commit transaction log and the heartbeat transaction log, wherein replicating the commit transaction log and the heartbeat transaction log causes updating the snapshot delay value to reflect a new delay based on the replicated commit transaction log or heartbeat transaction log.

The method may further include polling, in response to a statement requesting read operations in the second database the snapshot delay value, and selectively determining that the requested read database operations are executed in either the first database system or the second database system based on the polled snapshot delay value, causing the second database system to update the replicated data image when replicating the statements or database operations of the generated transaction log files in the second database system, and updating the snapshot delay based on a timestamp associated with the update. The method may further comprise requesting the snapshot delay of the second database system, and selectively determining to route a client read statement containing a request for a read database operation to the second database system based on the snapshot delay, and routing the read statement to the second database for execution or routing the read statement to a client application including instructions that the read statement is to be routed to the second database. The method may further comprise routing the read statement to the second database; generating a new snapshot delay; and denying execution of the read statement in the second database based on the new snapshot delay; and routing the read statement back to the client application with information indicative that the read statement was not executed due to the new snapshot delay.

In some aspects, a method is provided that includes replicating a first database in a second database while the first database is subject to ongoing database operations responsive to client application statements; generating a snapshot delay value indicative of a delay in time between a database operation becoming visible to the client application statements in the first database and a replicated database operation becoming visible in the second database, the replicated database operation associated with the database operation, wherein generating a snapshot delay comprises: generating the snapshot delay by calculating a difference between a first timestamp associated with the replicated database transaction becoming visible in the second database and a second timestamp associated with the database operation becoming visible in the primary database; or generating the snapshot delay by calculating the difference between a current system time of the secondary database and the second timestamp.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads by enabling effective load balancing techniques for balancing the workload of a primary system with a backup database system. Protecting the amount of system resources available to replaying transaction logs at the secondary database or a backup database system may be maintained in a near current state with respect to a primary system that is under continuous use by one or more applications or users. Guaranteeing a minimum amount of system memory ensures that the log reply speed at the backup system can sustain the pace of log generation speed of a primary system under write-intensive workloads. By enabling near current and consistent transactional visibility of transactions that are replicated from a primary database the secondary database is able to assume a portion of the workload of a primary database system while also providing meaning returns in support of that workload. Without protecting system resources allocation to the replication processes, memory allocation to an intensive workload will may degrade the replication processes thereby causing a substantial delay between an update in the primary system and when that update is replicated in the secondary, or backup, system, and may make the secondary, or backup, database system ineffective in providing support to load balancing operations. The subject matter described herein allows a computer system to maintain consistent and useful, near-current, data visibility by a secondary database while data is updated and table structures are modified while concurrently replicating the of data the primary database system in the secondary database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 6a and 6b are diagrams illustrating two exemplary potential sources of delay between a source database and an associated asynchronous replica;

FIG. 7 is a process flow diagram illustrating generating a snapshot delay based on a heartbeat;

FIG. 8 is a process flow diagram illustrating generating a heartbeat log after a predefined heartbeat period elapses.

Like reference symbols in the various drawings indicate like elements.

DETAILED DESCRIPTION

Figure 1:
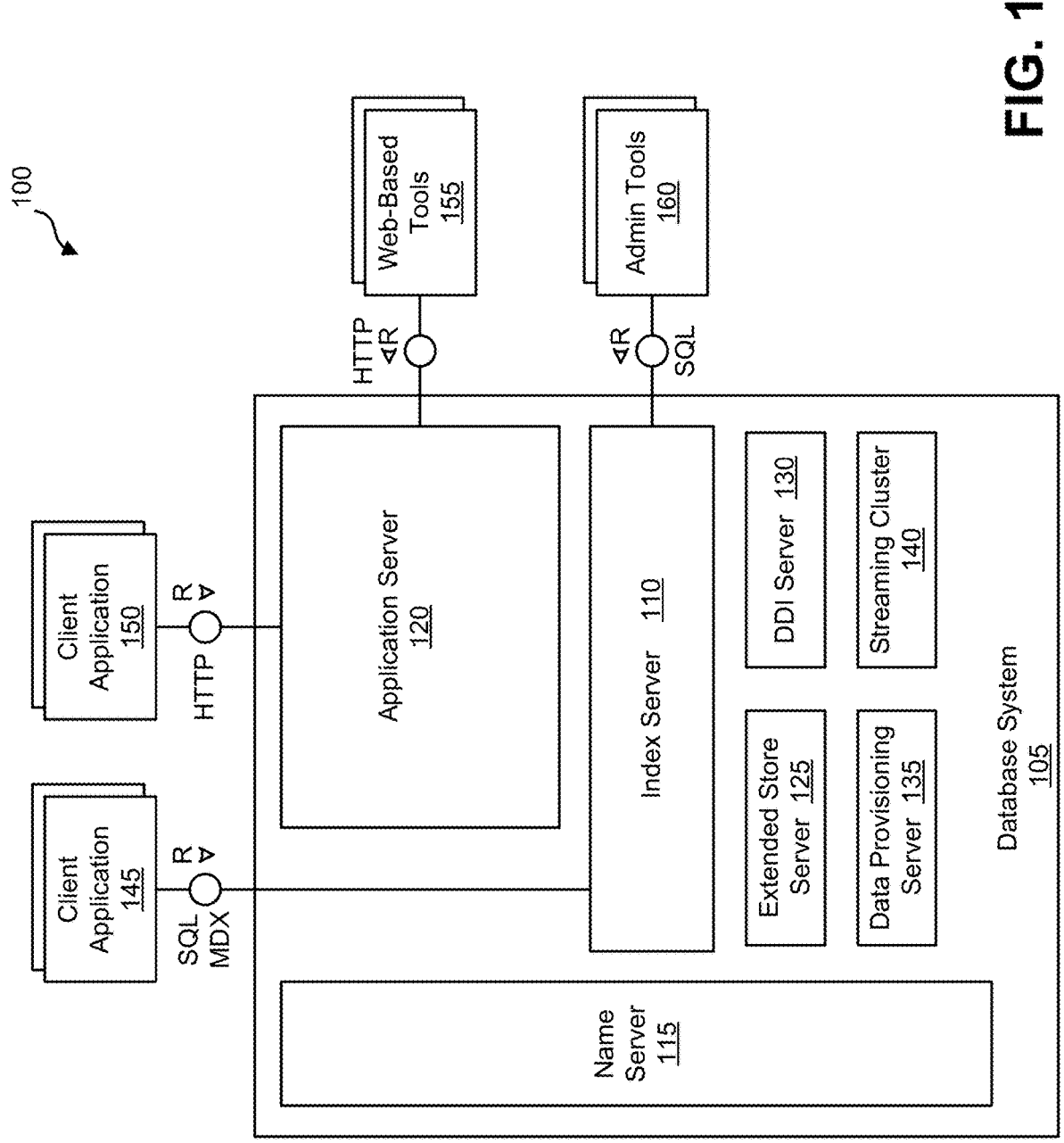
FIG. 1 is a system diagram illustrating an example database system for use in connection with the current subject matter.

The current subject matter is directed to enhanced techniques for managing a workload load balancing scheme when mirroring a primary database system in a backup database system, for example when such load balancing is executed concurrently with replay of database operations using, for example, a redo log.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory.

Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (e.g., backup or redundant or replica) copy of the data associated with the database. In some implementations, the database may include more than two datacenters (e.g., three or four datacenters). In some implementations, either one or both of the databases is a distributed system or a single server system.

To better utilize the second (and subsequent) datacenter(s), some database systems, such as SAP HANA®, may simultaneously utilize the first datacenter and the second datacenter. In this mode of operation, the first datacenter may be configured to delegate, or route, queries to the second datacenter to balance the workload between the two systems. Such a situation may be referred to as Active/Active (AA) operation since the first datacenter and the second datacenter both actively respond to queries, or statements, at the same time by executing database operations responsive to the queries, or statements, in order to provide a response, or return. In some implementations only certain types of queries, or statements, may be responded to, or alternatively executed, by the first datacenter or the second datacenter.

In some implementations such balancing may only occur when conditions of the first datacenter and the second datacenter are satisfied. The second data center may replicate the first database of the first database center in a second database of the second data center, and load balancing may only occur when a time delay between the two data centers is sufficiently small, or when a delay in the replication processes at the second datacenter is sufficiently small. In some implementations, the replication processes may take priority over the ability of one or more datacenters to support the load balancing operations.

When two or more datacenters or two or more database systems are engaged in load balancing operations, a client application, reliant on a database maintained by the first database system and replicated in the second database system, may restrict execution of queries to either the first database system or the second database system. In such a system, the client application may modify a query, or package a query, with additional routing information identifying which database may execute the query and under what conditions.

In some embodiments the client may dispatch or issue or transmit its queries directly to the database system it wants to obtain a response or return from. In other embodiments one or more processes at the client application, the first database system, or the second database system inform the client application which system will execute the statement or query. In other embodiments, the client application always issues its statements or queries to the first database system. The first database system includes various processes, in a standalone server or in a server providing other database services, that support the load balancing operations by maintaining state data, or having access to such state data, and making determinations as to whether the statement will be executed in the first database system or the second database system. If the load balancing processes determine that a statement may be executed by the second database system, a statement is routed back to the client application with an indication that a statement is to be executed in the database of second database system, that may be a backup or replica of the database of the first database system. Then the client application issues the query to the second database system for execution, and such execution can be contingent upon certain conditions, such as for example a delay between when a transaction is visible in the primary database system and when the same transaction is replicated and subsequently visible in the secondary database which may be an asynchronously replicated near mirror image of the primary database system, or source database.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup, or replicated, database systems to execute queries to reduce the workload of a primary database system, while ensuring that the database systems return accurate and relevant results. When a query may be routed from a primary database to a secondary database, if the second database system's state falls behind the current state of the primary database system by a significant amount, a return provided by the secondary database may be inaccurate or irrelevant by returning outdated data. A secondary database system's state may fall behind a primary system's state, for example, when the replication processes is unable to maintain pace with ongoing primary system updates.

When a secondary, or backup, database system serves the purpose of HA/DR functionality, an apparatus, system, technique or article that utilizes a secondary, backup database system to increase throughput of a workload on a primary database system must not interfere with the HA/DR functionality of the backup system. The use of the backup database system to increase throughput must also maintain the backup database in substantially the same state as the primary database. In the event of primary database system failure, the backup database can assume the role of the primary database in as little time as possible. Therefore, transactions replicated, or mirrored, to the secondary database must be as close to current as possible.

In a system that mirrors a primary database in a secondary database by transaction log reply, generation of and subsequent replay of transaction logs may not be able to keep pace with real time data transactions in a database system. Under heavy write-intensive workloads, replay of transactions executed in the primary by replay of transaction logs may be optimized by one or more techniques to minimize any delay, for example, transaction replication may be performed by various threads asynchronously operating on distinct dedicated logical cores of a multi-core processor. Because the replication processes execute asynchronously, there is no guarantee that updates to the primary database will be replicated in the same order as they are executed in the primary database system. In order to provide meaningful and useful workload support, a secondary system must be able to provide temporally consistent view into the data of the replicated database. One possible way of providing transactionally consistent view is by maintaining a global commit timestamp in the replicated database, which establishes the visibility of all transactions, by making visible all transactions committed in the replicated database before the global commit timestamp and making invisible all transactions not yet committed as of the global commit timestamp. The global commit timestamp may be associated with the most recently committed transaction in the replicated database system. As long as the secondary database presents consistent views into the data, it is acceptable that the replication may be slightly delayed. Determining what is an acceptable delay is left to a particular application designer.

Therefore, it is desirable to measure the replication delay between a primary system and its secondary, replicated, or backup, database system and make that delay available for decision making at the database system or application level. Also, in order enable functional and useful load balancing, statements routed to the backup database system that encounter a substantial delay between the data visibility, or the snapshot, of the secondary database system and its primary database system, should be routed back to the client application or to the primary database system with an indication that the statement was not executed due to the snapshot delay.

FIG. 1 is a diagram 100 illustrating a database system 105 that can be used to implement aspects of the current subject matter. The database system 105 can, for example, include an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
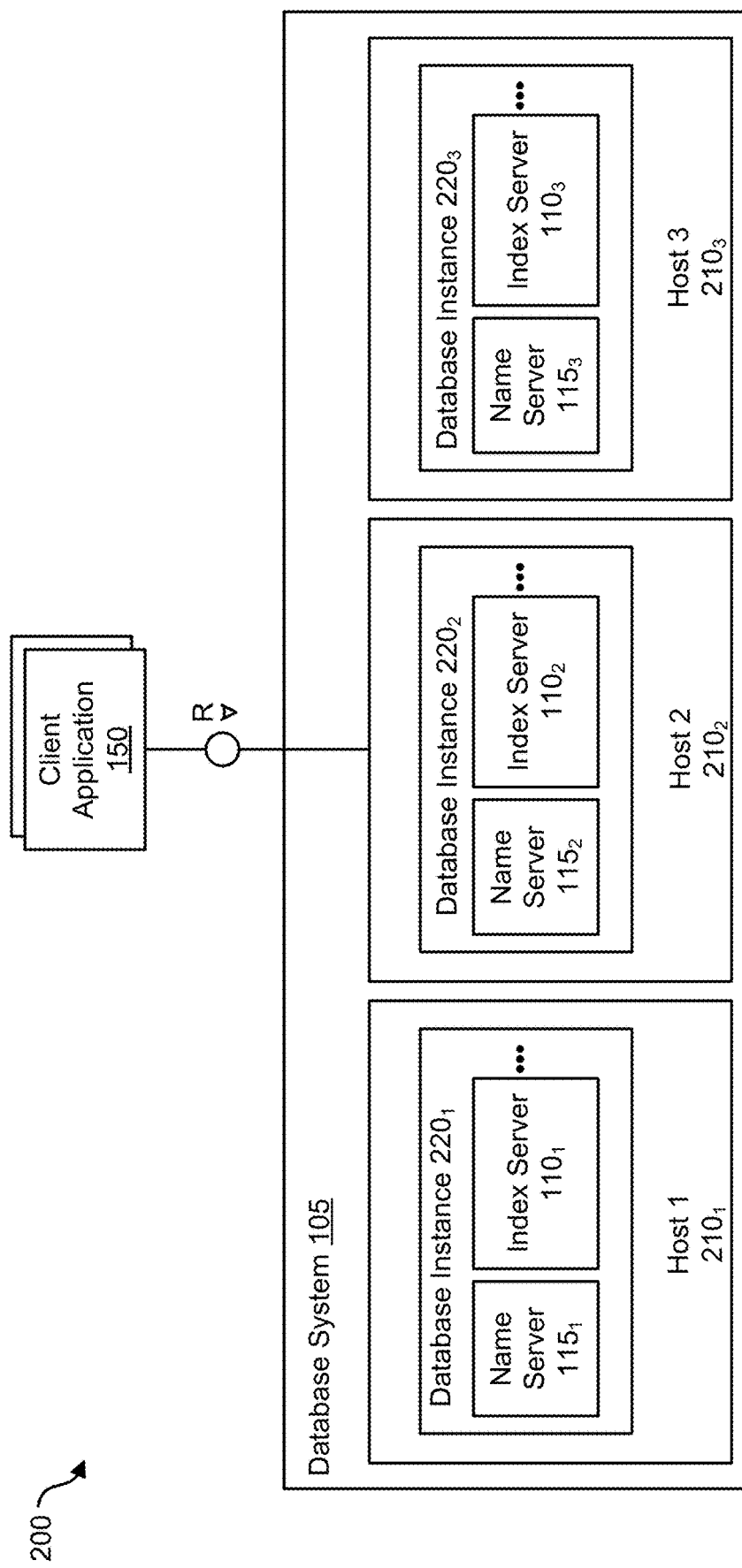
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
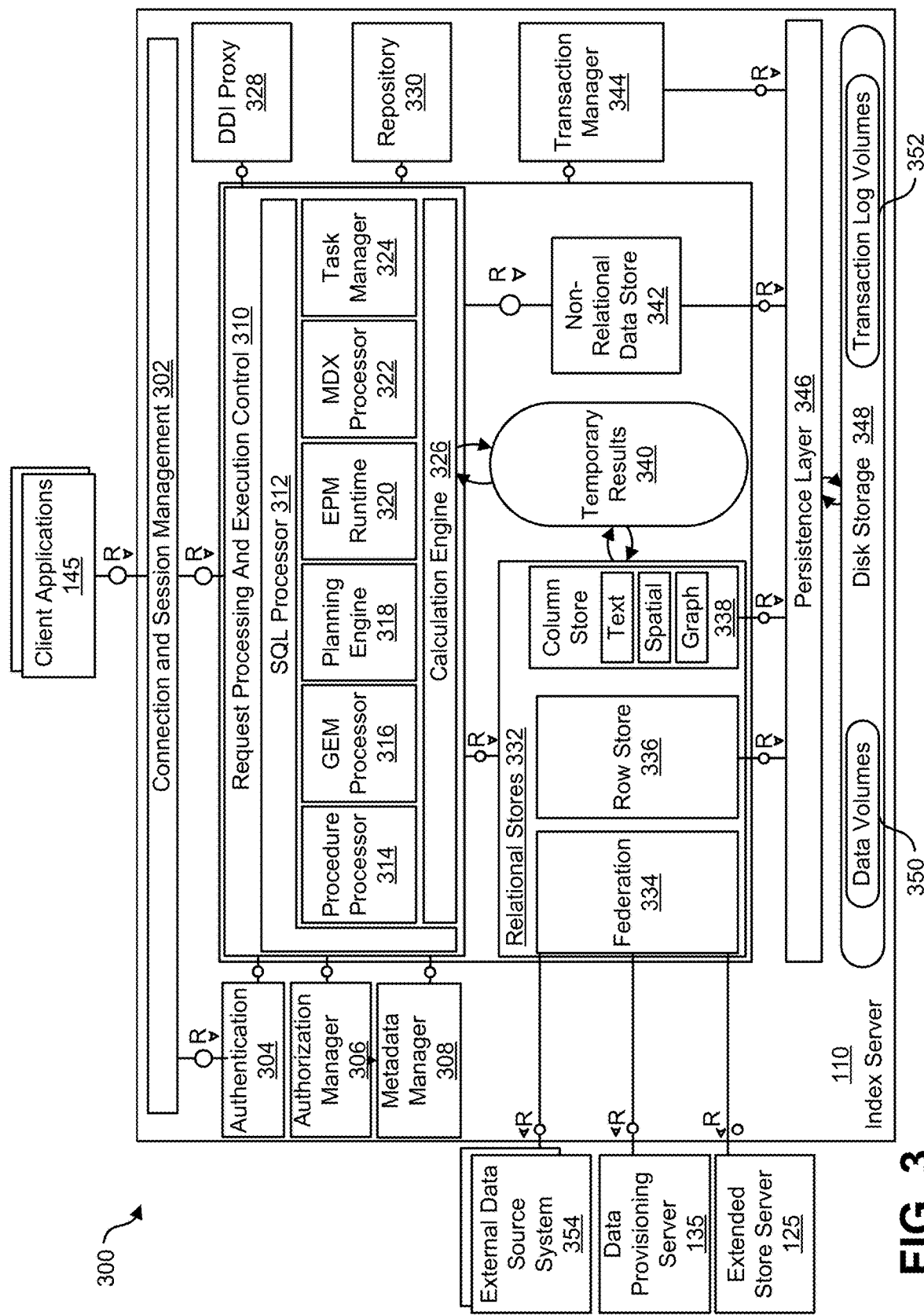
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written in the persistence layer 352 (e.g., in transaction log volumes 352) explicitly by using a log interface or implicitly when using the virtual file abstraction. The transaction log volume 352 can include redo logs which specify database operations to be replayed as well as undo logs which specify database operations to be undone.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
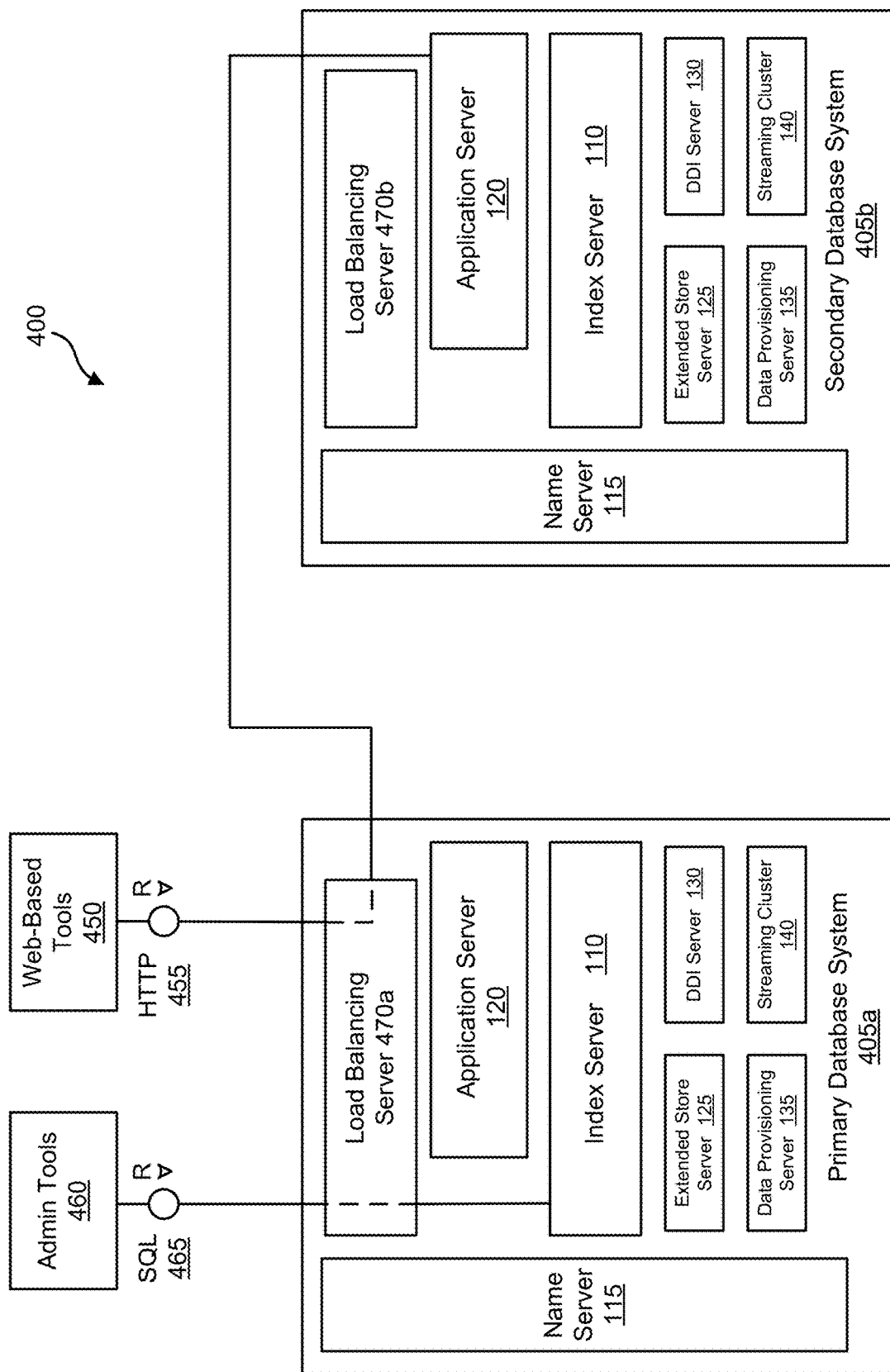
FIG. 4 is a functional flow diagram illustrating an architecture to support load balancing between a primary database system and a secondary database system.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload. The various load balancing processes operating in server 470a or 470b may be components of a larger DBMS system for managing the primary system 405a and secondary system 405b.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
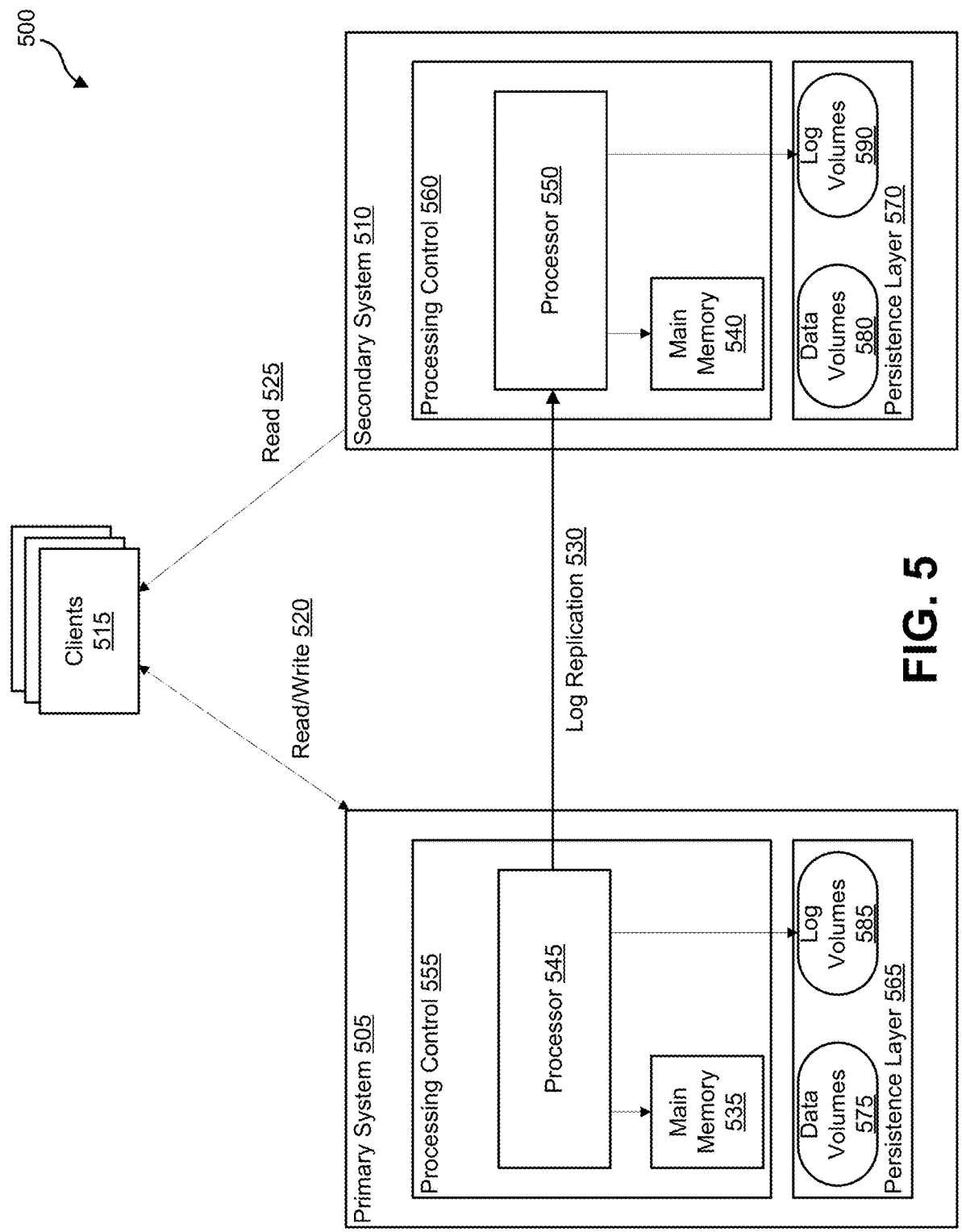
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510. These various components may comprise a DBMS system for controlling the HA/DR system 500 and constitute various processes and components executing within processing control 555, 560 and the persistence layer 565, 570. The DBMS system therefore interacts with and maintains the database as it is held in main memory 535, 540 and persisted in the persistence layer 565, 570.

A collection of clients may each maintain an open connection to both the primary system 505 and the secondary system 525. Clients 515 may interact with a database managed by the primary system 505 or the secondary system 510. Such clients may interact through client applications or through components of the DBMS system executing at the client 515. In other cases, the clients may rely on a client application library containing various processes and techniques for interacting with the database systems. For example, a client 515 maintains a read/write connection for issuing read and write statements 520 to the primary system 505 and a read only connection for issuing read statements 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. In embodiments read/write statements 520 are issued to the primary database system 505, while only read statements 525 are issued to the backup, or secondary, database system 510.

In embodiments load balancing of the workload required by a client application executing at client 515 is managed by the client 515 application itself. Alternatively, a client 515 application may submit a query request to either the primary system 505 or the secondary system 510 with routing data indicating that the statement may be load balanced, or routed to the secondary database system 505, and including one or more routing conditions. Process control 555, 560 load balancing processes executing on processor 545, 550 may then determine where the query should be executed and replies to the client 515 with instructions identifying which system the client 515 should issue the query to. This determination may consider various conditions related, among other things, to the state of a primary database system 505 or a state of the secondary databse system 510. For example, the determination may consider a delay between the current transactions executing in the primary system and the secondary system caused by the time required to replicate transactions of the primary system in the secondary system.

Primary system 505 may include an in-memory database in which substantially all actively used data may be kept and maintained in main memory 535 so that operations can be executed without disk I/O, which requires accessing disk storage. As statements are execute the in-memory database is updated by various database operations caused by the statement. In embodiments, these database operations also generate transaction logs which are shipped to the secondary system 510 for replication 530 in the secondary database system 510. During replication the secondary database system 510 mirrors the primary database system 505. In embodiments, applications that rely on the primary database system 505 may allow for transactions to be executed in the replicated or mirror database at the secondary database system 510. These applications may impose conditions on when a requested transaction can be routed to a secondary database 510. This routing may occur when the primary database system 510 is engaged in load balancing of a workload between the primary system 505 and the secondary system 510. One potential condition may be that the statement may only be routed to or executed in the secondary database system when a delay in time between the current operations in the primary system 505 and the replication of the primary system in the secondary system 510 is below a threshold.

In embodiments, primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

In embodiments, primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes processes that cause processor 550 to then replay the transaction logs replicated from the primary system 505, thereby replicating or mirroring the transactions or data at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in transaction logs being persisted in log volumes 590.

Transaction logs (e.g., redo logs, undo logs, cleanup logs, commit logs, savepoint logs, heartbeat logs, etc.) may be replicated 530 in different ways. In embodiments, a standby system is maintained in nearly the same state as the primary system, and logs may be replicated synchronously meaning that the primary system will not commit a transaction until the secondary successfully responds to the log replication. Such an arrangement slows performance of the primary system 505, 405a. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

A secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515 except when there is no workload at the primary database system during which time the replication processes may catch up to the primary database system. Also, there is no guarantee that a query routed to the primary system in a load balancing effort will be executed before, during or after a particular transaction log is replayed. Thus, the state of the primary system 505 and the state of the secondary system 510 will rarely if ever be identical. But, by addressing certain concerns, a replicated system, or secondary system, 510 may be kept in a state substantially close to the state of the primary system 505 such that the workload required by many operations can be supported by the secondary 510.

As discussed above, when a secondary, or backup, database system 405b, 510 serves the purpose of HA/DR functionality, and a load balancing operation simultaneously utilizes the secondary, backup, database system 405b, 510 to increase throughput of a workload on a primary database system, the load balancing operations may give rise to a delay between the primary database system 405a, 505 and the secondary database system 405b, 510. The use of the backup database system 405b, 510 by load balancing operations to increase throughput ideally maintains the backup database in nearly the same state as the primary database. But, when the replication processes are asynchronous, they may cause a delay between when particular transactions are executed and committed, and thus visible, in a primary database system 405a, 505 and when those transactions are replicated, and thus visible, in the secondary database system 405b, 510.

When a delay develops between the primary system and the secondary system, a query executed in the primary system, e.g. 505, may obtain different results from the exact same query executing in the secondary system, e.g. 510, as the exact same time. In such a case, the visibility of the data within each database is different by virtue of the replication process. What is visible to queries, or statements, executed in the primary database at t[n] may only be available in an associated database at a later time t[n−d] where d is the delay. In embodiments, the visibility of data (i.e. what a query may return by virtue of what has been committed to the particular database) is referred to as a snapshot. When a query, or statement, is received, that query is presented a snapshot of the database at the time the query is received, and the basis for the return to the query is the snapshot. In many cases, a delay between a snapshot in the primary database 505 and the same snapshot in the secondary database 510 may be acceptable so long as the results are consistent and the delay is within an allowable length of time as determined by the application or system designer.

In general, a delay between snapshots may be calculated as TS2−TS1, where TS1 is a time when a committed change becomes visible in the primary system (e.g. when a change becomes visible to a snapshot) and TS2 is a time when the same committed change becomes visible in the replicated database (e.g. the secondary database, or the backup database). But, it is preferable to calculate and manage a delay while minimizing the overhead in a workload. Thus, in the replicated database system, e.g. 510, a delay should be calculated without reference to the primary database system. When an application desires to know the delay, it may issue a request to the secondary system 510, which then generates the delay based on information available at the secondary system 510. Also, when a statement is issued to the secondary database system 510, and the statement requests database operations of the secondary database system 510 so long as a maximum delay is not exceeded, the secondary database system 510 is able to determine the delay without reference to the primary database system 505.

In embodiments, instead of relying on TS1 and TS2, calculating the delay relies on alternate, approximated, timesstamps associated with TS1 and TS2. Instead of time TS1, the time a transaction becomes visible in the primary database system 505 may be approximated instead by a timestamp A_TS1 associated with when a commit operation is written to a transaction log. Or TS1 may be sufficiently approximated by A_TS1, a timestamp generated when the commit log itself is written into a replication send buffer of the primary database system 505 causing the transaction log containing the commit log to be sent to the secondary database system 510 as part of the mirroring or replication 530 processes. Similarly, instead of TS2, the time a committed change becomes visible in the secondary, backup, or replicated database 510 may be approximated by A_TS2, a timestamp when the commit operation is replicated or replayed in order to become visible in the secondary database. These approximations may be acceptable because in many applications one second may be an acceptable minimum unit of time delay. The difference between TS1 and A_TS1 will be nearly identical, and differing on the nanosecond, microsecond, or milisecond scale. Based on system design and preferences, any timestamp sufficiently close to when the data becomes visible in the snapshot of the particular database will suffice, and can be chosen during design time based on process execution flows within each database system.

In embodiments, certain exceptions must be dealt with when determining a delay between a database system, e.g. 505, and its replicated backup system, e.g. 510. For example, in a first case a primary system 505 may commit transactions during a period of time while the secondary system 510 is not receiving replication logs, for example if there are issues with the network between the two systems interrupting log replication 530. Another case arises when the databases are fully synced, but the primary system 505 does not send replication logs, because the primary system 505 has not committed any new changes to be replicated. In the first case, the delay is real, and the client application or end user should be aware of the delay in order to take appropriate action. In the second case, however, the delay arises because, e.g. TS2 or A_TS2, is based on the last time a commit log was replayed in by the secondary database 510. In this case, the delay is not real, but instead is a result of how the delay is calculated. Relying on the general formula TS2−TS1 or A_TS2−A_TS1 will handle the second case (e.g. show an accurate delay based on the delay calculated the last time a log was replicated), but the case where network problems preclude, or delay, replication of the transaction logs will not be detected and the delay will grow without explanation.

In embodiments, a system heartbeat-like approach is implemented, based on the sending and receiving of transaction logs, and without the need for a separate heart-beating protocol between the source, or primary, database system 405a, 505 and the replica, or secondary, or backup, system 405b, 510. In embodiments, when a commit transaction is executed, a transaction log reflecting this is generated including a commit timestamp, and other associated timestamps, and then the transaction log is queued in a send buffer to be sent 530 to the secondary database 510 for replication. Thus, by leveraging this process of generating, sending, and replicating transactions based on transaction logs, a heartbeat like operation can be implemented without a distinct heartbeat protocol separate from the transaction log replay processes.

This heartbeat operation may be managed by the DBMS of the primary or secondary database system. For example, the primary system may keep track of the time after a commit operation is executed in the primary system. For example, the primary system may set a timer when a transaction is committed, and subsequently reset the time every time a transaction is committed. Or, the primary system may keep track of how long a transaction log send buffer remains empty. Or, the primary system can determine a period of time has elapsed since a last update by any suitable means. In any case, the primary system 505 may determine that a sufficient period of time has elapsed since the last update, commit, or send operation associated with database replication has occurred, and then generate and send a heartbeat log to the secondary database system 510. This heartbeat log may be a dummy commit log, or a false commit transaction, or it may not contain any transaction data at all, and simply include one or more timestamps associated with the heartbeat log.

When this heartbeat log, or dummy commit log, or false commit transaction is received by the secondary system 510, or when it is replayed as part of the replication processes 530, the delay is updated in the secondary system based on a timestamp associated with the heartbeat log. This timestamp associated with the heartbeat log may be referred to as a heartbeat timestamp. The update timestamp associated with the heartbeat log may be a dummy commit timestamp, or a send timestamp associated with the sending, or a buffer write timestamp associated with the writing of the heartbeat log to the send buffer. Any timestamp sufficiently close to the commit operation will suffice and may be selected based on system design. In other cases, the DBMS processes in process control 545 and 550 will be preconfigured with a selected timestamp. The DBMS may also have a configurable timestamp allowing a system administrator to select which timestamp to rely on for calculating snapshot delay.

In embodiments, when a query or statement is received for execution at a secondary database system 405b, 510, the snapshot delay may be calculated by processes within process control 560 executing on processor 550, according to the following rules. First, a defined heartbeat period is established. Then, if the current system time ("CTS") less TS2, or A_TS2, is less than a defined heart-beating period, the snapshot delay is TS2-TS1, or A_TS2-A_TS1. But, if the CTS less TS2, or A_TS2, is greater than the heart-beating period, then the snapshot delay is equal to the CTS-TS1, or A_TS1, where TS1 and A_TS1 is a timestamp associated with a heartbeat log. Thus, if the time between a last commit replicated, or received, by the secondary database system 510 occurred within the previous defined heartbeat period, then the snapshot delay is equal to (TS2||A_TS2)-(TS1||A_TS1). But if the last commit replicated or received by the secondary database system 510 occurred further in the past than the defined heartbeat period, the delay is equal to CTS-(TS1||A_TS1). In each situation TS1 and TS2 are respectively the time a commit becomes visible in the primary, and the time the commit becomes visible in the secondary. And, in each situation A_TS1 and A_TS2 are timestamps associated with acceptable approximations of TS1 and TS2 as selected by the system designer (e.g. A_TS1 may be the time the transaction log was written to a send buffer, and A_TS2 may be the time the transaction log was replayed).

This snapshot delay may be relied upon when determining whether a secondary database system 510 is sufficiently close in time to an associated primary database system 505 that it may provide support for routed statements in a load balancing operation of an HA/DR system 500. For example, when a statement is received at the secondary database system 510, the snapshot delay can be evaluated against a predetermined maximum delay parameter, and if the snapshot delay exceeds the maximum delay identified by the maximum delay parameter, the secondary database system can initiate a fallback procedure. For example, the secondary database system 510 may mark the statement as unexecuted and return it to the issuing client or client application. The returned unexecuted statement may include information indicative of the delay. If the statement was routed to the secondary database system 510 by the primary database system 505, the secondary database system may reply to the primary database system with information indicative of the delay and that the statement was not executed in the secondary database system 510.

A client 515 application, or the load balancing operations of HA/DR system 500, may also from time to time poll the snapshot delay of the secondary database system during load balancing operations to determine whether to route a statement to the secondary database system for execution. A client 515 application, or the load balancing operations of system 500, may also address fallback procedures in a way that is tailored to the application, as determined by an application or system designer. For example, the client application 515 may issue the fallback statement to the primary system 505 for execution. This may be the case where the application seeks to minimize the time waiting to receive a response to the statement. Alternatively, the client application 515 may wait a predetermined amount of time and reissue the statement to the secondary database system to reattempt execution there. This may be the case where non-critical queries are always routed to a secondary system 510 based on policies of system 500 in order to free primary database system 505 resources for critical tasks. Alternatively, where the load balancing processes dictate where statements are executed the client application 515 may inform the load balancing processes, e.g. in process control 555, or of load balancing server 470a or 470b, of the delay and allow the load balancing processes to determine how to address secondary database 510 snapshot delay.

FIGS. 6a and 6b illustrate two potential ways a snapshot delay arises between a primary database system 610a, 610b and a secondary database system 620a, 620b. A primary database system 610a, 610b and a secondary database system 620a, 620b are engaged in transaction log replication 530 to enable a secondary database system 620a, 620b to mirror the primary database system 610a, 610b. In the first possible scenario, a transaction comprising database operations requested by a statement causes an update to the primary database 610a. The primary database 610a is part of an HA/DR system, such as HA/DR system 500. It has an associated secondary database 620a. Once the update is committed, the primary database system 610a writes the commit log to the global log send buffer 630a and the log is replicated 530 to the secondary database system. Thereafter, the primary database system 610a writes the commit log to disk 640a and then at TS1, the committed change becomes visible to statements received at the primary database system. After the transaction logs are replicated 530 to the secondary database system they may be stored to a persistent disk 660a, before they are replayed 670a and then become visible 680a at TS2, later than TS1 giving rise to the delay.

Similarly, in the second potential scenario, a transaction comprising database operations requested by a statement causes an update to the primary database 610b. The primary database 610b is part of an HA/DR system, such as HA/DR system 500. It has an associated secondary database 620b. Once the update is committed, the primary database system 610b writes the commit log to a persistent disk 640b, for example in the persistence layer 565. Subsequently, the committed changes become visible 650b in the primary database system 610b to subsequent statements at TS1. Then the commit log is written to a replication log send buffer 660b (which in embodiments is an example of one potential approximated TS1 or A_TS1), and the log is replicated 530 to the secondary database system. After the transaction logs are replicated 530 to the secondary database system 610b they may be replayed 670b and then become visible 680b at TS2, later than TS1 giving rise to the delay. In addition to illustrated operations in FIGS. 6a and 6b, delay between TS1 and TS2 can arise for numerous reasons, and note that any network delay will increase the amount of time delay caused by the log replication 530 processes.

FIG. 7 is a process flow diagram illustrating an arrangement in which, at 710 transactions of a first database system are replicated in a second database system. Thereafter, at 720, a snapshot delay indicating a delay between transactions executing in the first database system becoming visible in the second database system, the snapshot delay is based on the replication of a commit transaction in the second database associated with a commit transaction executed in the first database. Further, at 730, it is determined that a predefined period of time has elapsed since replicating the commit transaction in the second database. Then, at 740, a second snapshot delay is generated based on a current system time and a time associated with the heartbeat log received from the first database. A statement requesting transactions in the secondary database can then be selectively executed or denied, at 750, based on the generated second snapshot delay.

FIG. 8 is a process flow diagram illustrating an arrangement in which, at 810, transaction logs of a first database system are sent to a second database system in order that the first database system can be replicated in the second database system based on the transaction logs. Thereafter, at 820, a transaction log is generated containing a timestamp associated with a commit transaction in the first database system. Subsequently, it is determined that a predefined period of time has elapsed, at 830, without the first database system committing any transactions. Then, responsive to the determination, a heartbeat transaction log having an associated timestamp is generated at 840. This is then sent to the secondary database system at 850.

Figure 9:
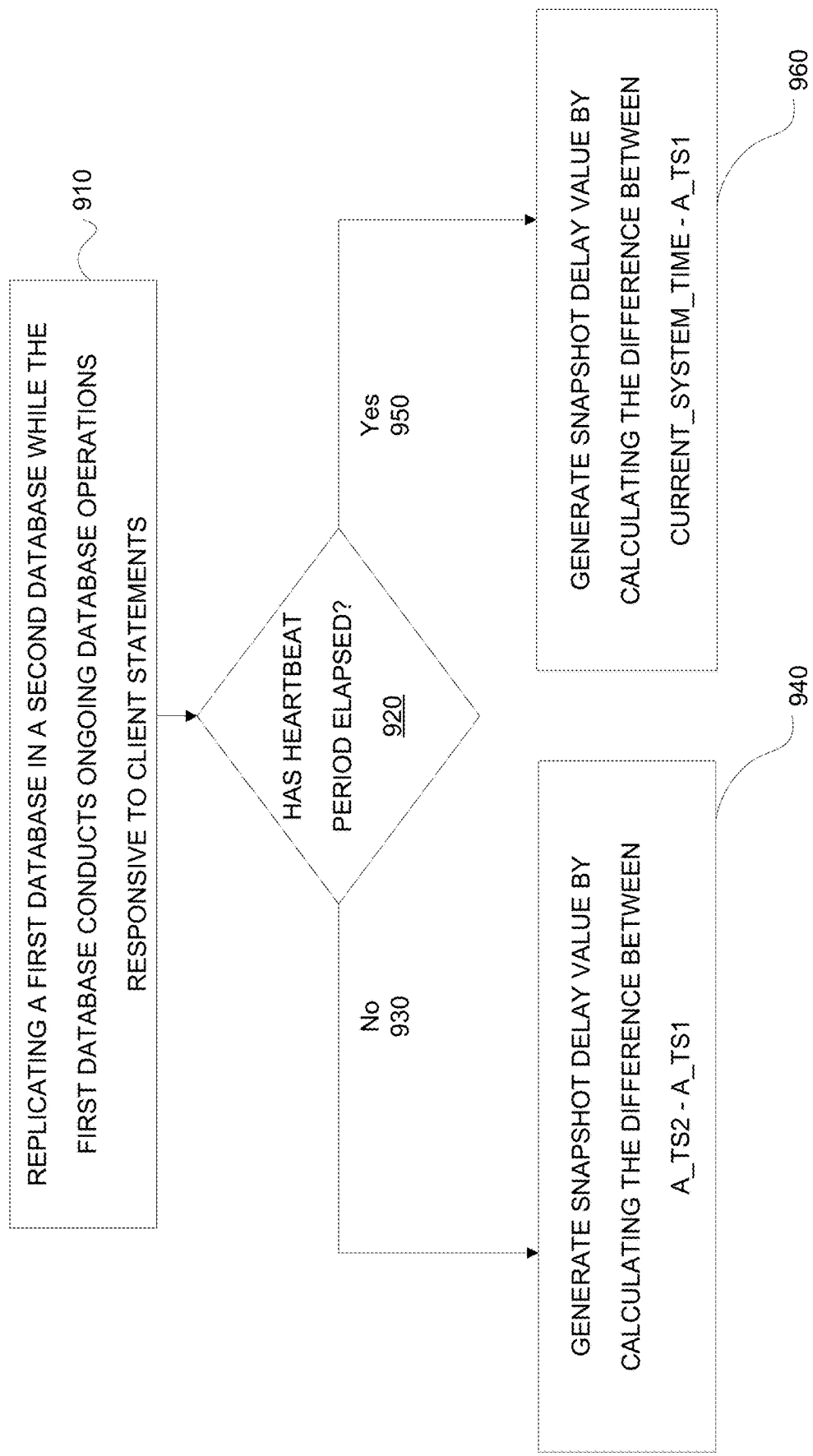
FIG. 9 is a process flow diagram illustrating generating a snapshot delay based on whether a predefined period of time has elapsed.

FIG. 9 is a process flow diagram illustrating an arrangement in which, at 910, a first database system is replicated in a second database system during ongoing database operations responsive to client statements. At 920, a determination is made that a predefined period of time has elapsed 930 or has not elapsed 950. If the period of time has not elapsed, a snapshot delay is generated, at 940, based on a difference between A_TS2, an approximation of TS2 as discussed above, and A_TS1, an approximation of TS1 as discussed above. If the period of time has elapsed, a snapshot delay is generated, at 950, based on a difference between a current system time of the secondary database system (current_system_time) and A_TS1, an approximation of TS1 as discussed above.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computer processors forming part of at least one computing device, the method comprising:

replicating, by at least one computer processor, transactions of a first database system in a second database system including a commit transaction associated with a statement received by the first database system;

determining, by at least one computer processor, a delay between the first database system and the second database system based on a first timestamp associated with the commit transaction and a second timestamp associated with the commit transaction becoming visible in the secondary database;

determining, by at least one computer processor, that a predefined period of time has elapsed since replicating the commit transaction;

receiving, by at least one computer processor, a heartbeat log generated by the first database system when a period of time elapses without the first database system performing a second commit database operation;

determining, by at least one computer processor, a second delay based on a second database system time and a third timestamp associated with the heartbeat log; and selectively determining, by at least one computer processor, to execute or to deny a statement received by the secondary database system based on the second delay.

2. The method for implementation by one or more computer processors of claim 1 further comprising generating, by at least one computer processor, a return associated with the statement, the return including all records of the second database system relevant to the statement and having a commit timestamp less than or equal to a commit timestamp associated with the commit transaction.

3. The method for implementation by one or more computer processors of claim 1 further comprising:

receiving, by at least one computer processor, a second client statement requesting a second read operation; and determining, by at least one computer processor, to deny the second client statement based on a third delay generated based on a current second database system time and the heartbeat log.

4. The method for implementation by one or more computer processors of claim 3 further comprising, responsive to the determination:

routing, by at least one computer processor, the second client statement to the first database system.

5. The method for implementation by one or more computer processors of claim 3, wherein the determination is in response to routing data associated with the second client statement indicating that the second client statement may be executed in either the first database system or the second database system.

6. The method for implementation by one or more computer processors of claim 1 further comprising:

receiving, by at least one computer processor, a second client statement including routing data and requesting a read operation, the routing data indicating that the statement may be routed to either the first database system or a second database system so long as a maximum snapshot delay is not exceeded by the second database system;

determining, by at least one computer processor, that the second client statement may be executed in the second database system based on either the delay or the second delay; and routing, by at least one computer processor, the statement to a client application with information indicating that the statement may be routed to the second database system to be executed.

7. The method for implementation by one or more computer processors of claim 1, further comprising executing the statement and generating a return associated with the statement, wherein the generated return includes the second delay, the method further comprising:

receiving, by at least one computer processor, the return including the second delay; and discarding, by at least one computer processor, the return based on the second delay.

8. The method for implementation by one or more computer processors of claim 1 further comprising:

requesting, by at least one computer processor, the delay from the second database system; and sending, by at least one computer processor, a third statement to either the first database system or the second database system based the delay.

9. A method for implementation by one or more computer processors forming part of at least one computing device, the method comprising:

replicating, by at least one computer processor, a first database in a second database while the first database is subject to ongoing database operations responsive to client application statements;

generating, by at least one computer processor, a snapshot delay value indicative of a delay in time between a database operation becoming visible to the client application statements in the first database and a replicated database operation becoming visible in the second database, the replicated database operation associated with the database operation, wherein generating a snapshot delay comprises:

after the replicated database operation becomes visible in the secondary database, and before a period of time elapses, generating the snapshot delay by calculating a difference between a first timestamp associated with the replicated database transaction becoming visible in the second database and a second timestamp associated with the database operation becoming visible in the primary database; or after the period of time elapses, generating the snapshot delay by calculating the difference between a current system time of the secondary database and the second timestamp.

10. The method of claim 9, further comprising generating, by at least one computer processor, a return associated with the statement, the return including all records of the second database relevant to the statement and having a commit timestamp less than or equal to a commit timestamp associated with the commit transaction.

11. The method of claim 9, further comprising:

receiving, by at least one computer processor, a second client statement requesting a second read operation; and determining, by at least one computer processor, to deny the second client statement based on a third delay generated based on a current second database system time and a heartbeat log.

12. The method claim 11, further comprising, responsive to the determination:

routing, by at least one computer processor, the second client statement to the first database system.

13. The method of claim 11, wherein the determination is in response to routing data associated with the second client statement indicating that the second client statement may be executed in either the first database system or the second database system.

14. The method of claim 9, further comprising:
receiving, by at least one computer processor, a second client statement including routing data and requesting a read operation, the routing data indicating that the statement may be routed to either the first database system or a second database system so long as a maximum snapshot delay is not exceeded by the second database system;
determining, by at least one computer processor, that the second client statement may be executed in the second database system based on either the delay or the second delay; and
routing, by at least one computer processor, the statement to a client application with information indicating that the statement may be routed to the second database system to be executed.

15. The method of claim 9, further comprising executing the statement and generating a return associated with the statement, wherein the generated return includes the second delay, the method further comprising:
receiving, by at least one computer processor, the return including the second delay; and
discarding, by at least one computer processor, the return based on the second delay.

16. The method of claim 9, further comprising:
requesting, by at least one computer processor, the delay from the second database system; and
sending, by at least one computer processor, a third statement to either the first database system or the second database system based the delay.

17. A non-transitory computer program product storing instructions which, when executed by at least one data processor forming part of at least one computing device, implement operations comprising:
replicating, by at least one computer processor, transactions of a first database system in a second database system including a commit transaction associated with a statement received by the first database system;
determining, by at least one computer processor, a delay between the first database system and the second database system based on a first timestamp associated with the commit transaction and a second timestamp associated with the commit transaction becoming visible in the secondary database;
determining, by at least one computer processor, that a predefined period of time has elapsed since replicating the commit transaction;
receiving, by at least one computer processor, a heartbeat log generated by the first database system when a period of time elapses without the first database system performing a second commit database operation;
determining, by at least one computer processor, a second delay based on a second database system time and a third timestamp associated with the heartbeat log; and
selectively determining, by at least one computer processor, to execute or to deny a statement received by the secondary database system based on the second delay.

18. The non-transitory computer program product of claim 17, wherein the operations further comprise generating, by at least one computer processor, a return associated with the statement, the return including all records of the second database system relevant to the statement and having a commit timestamp less than or equal to a commit timestamp associated with the commit transaction.

19. The non-transitory computer program product of claim 17, wherein the operations further comprise:
receiving, by at least one computer processor, a second client statement requesting a second read operation; and
determining, by at least one computer processor, to deny the second client statement based on a third delay generated based on a current second database system time and the heartbeat log.

20. The non-transitory computer program product of claim 17, wherein the operations further comprise, responsive to the determination:
routing, by at least one computer processor, the second client statement to the first database system, wherein the determination is in response to routing data associated with the second client statement indicating that the second client statement may be executed in either the first database system or the second database system.

* * * * *